United States Patent Office 2,965,652
Patented Dec. 20, 1960

2,965,652

PROCESS OF PREPARING GLYCIDYL ETHERS

Van R. Gaertner, Dayton, Ohio, assignor to Monsanto Chemical Company, St. Louis, Mo., a corporation of Delaware No Drawing. Filed May 13, 1958, Ser. No. 734,850

10 Claims. (Cl. 260—348.6)

The present invention relates to processes of preparing glycidyl ethers and more particularly provides a new and improved method of preparing glycidyl ethers or thio ethers having branched chain higher alkyl substituents.

The preparation of glycidyl ethers by dehydrochlorination of ether- or thio ether-substituted chlorohydrins is known in the art. Generally, the dehydrochlorination has been effected by treating the chlorohydrins with dry caustic, i.e., sodium or potassium hydroxide, in the presence of a non-aqueous diluent. While in some instances aqueous caustic has been used, yields obtainable thereby have not been as good as those obtained by conducting the reaction in the substantial absence of water. Moreover, chlorohydrins having a branched, long-chain alkyl substituent were found to be particularly sluggish; even when the dehydrochlorination was effected under substantially anhydrous conditions, e.g., with dry caustic in the presence of ether, the conversion to glycidyl ether was poor.

The present invention provides a method of obtaining good yields of the branched-chain higher alkyl substituted glycidyl ethers from the appropriate chlorohydrins which comprises the use of a lower dialkyl sulfoxide in conjunction with the aqueous alkali. The chlorohydrins which are advantageously employed in the present process have the formula

RXCH$_2$CHCH$_2$
          |  |
          Y  Z in which R is a hydrocarbon radical selected from the class consisting of branched-chain alkyl radicals of from 8 to 18 carbon atoms and alkyl-substituted aryl radicals wherein the alkyl substituent is branched and has from 8 to 18 carbon atoms and the aryl radical has from 6 to 12 carbon atoms, X is selected from the class consisting of —O— and —S—, and Y and Z are dissimilar radicals selected from the class consisting of —OH and —Cl, i.e., Y is —OH when Z is —Cl and Z is —OH when Y is Cl.

One class of compounds having the above formula includes the 1-alkoxy-3-chloro-2-propanols, i.e., compounds of the structure

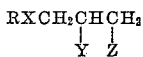

wherein R denotes a branched alkyl radical of from 8 to 18 carbon atoms. Examples thereof are 1-tert-octyloxy - 3 - chloro-2-propanol; 1-(2-ethylhexyloxy)-3-chloro-2-propanol; 1 - isononyloxy-3-chloro-2-propanol; branched-chain 1-nonyloxy-3-chloro-2-propanol wherein the nonyl radical is derived from the branched-chain nonanol prepared according to the "Oxo" process from carbon monoxide, hydrogen and diisobutylene; branched-chain 1-decyloxy-3-chloro-2-propanol wherein the decyl radical is derived from branched-chain "Oxo" process decanol prepared from carbon monoxide, hydrogen and propylene trimer; 1-(2-propylheptyloxy)-3-chloro-2-propanol; 1 - (5 - ethyl-nonyloxy)-3-chloro-2-propanol; 1-(2,6,8 - trimethylnonyloxy) - 3 - chloro-2-propanol; 1-(2-butyloctyloxy-3-chloro-2-propanol; 1 - tert-dodecyloxy-3-chloro-2-propanol; branched-chain 1-tridecyloxy-3-chloro-2-propanol wherein the tridecyl radical is derived from the branched-chain tridecanol according to the "Oxo" process by the high temperature, high pressure reaction of carbon monoxide and hydrogen with an olefin polymer selected from the class consisting of triisobutylene and tetrapropylene; 1-(7-ethyl-2-methyl - 4 - undecyloxy)-3-chloro - 2 - propanol; branched-chain 1-hexadecyloxy-3-chloro-2-propanol wherein the hexadecyl radical is derived from a branched-chain "Oxo" process hexadecanol obtained by the reaction of carbon monoxide and hydrogen with propylene pentamer, and 1-tert-octadecyloxy-3-chloro-2-propanol.

The above 1-alkoxy-3-chloro-2-propanols are converted, in the presence of aqueous alkali and a dialkyl sulfoxide, into glycidyl ethers wherein the alkyl radical corresponds to that present in the alkoxy group; thus

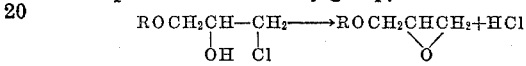

Examples of alkyl glycidyl ethers provided by the process are thus branched-chain nonyl, decyl, tridecyl and hexadecyl glycidyl ethers wherein the branched-chain alkyl radicals are derived from either the "Oxo" process nonanol, the "Oxo" process decanol, the "Oxo" process tridecanol or the "Oxo" process hexadecanol described above; and such other branched-chain alkyl glycidyl ethers as 2-ethylhexyl glycidyl ether, tert-octyl glycidyl ether, 2-propylheptyl glycidyl ether, 5-ethylnonyl glycidyl ether, 2,6,8-trimethylnonyl glycidyl ether, 2-butyloctyl glycidyl ether, tert-dodecyl glycidyl ether, tert-pentadecyl glycidyl ether, tert-heptadecyl glycidyl ether and tert-octadecyl glycidyl ether.

Instead of employing the 1-alkoxy-3-chloro-2-propanols for preparing the branched-chain alkyl glycidyl ethers according to the present process, I may use the branched-chain 3-alkoxy-2-chloro-1-propanols, whereby the present dehydrohalogenation process likewise effects ring closure to the epoxy group; thus

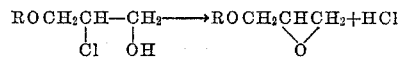

wherein R is a branched-chain alkyl radical of from 8 to 18 carbon atoms. Thus, from 3-tert-octyloxy-2-chloro-1-propanol there is obtained tert-octyl glycidyl ether; from 3-(2-ethylhexyloxy)-2-chloro-1-propanol there is obtained 2-ethylhexyl glycidyl ether; from branched-chain 3 - nonyloxy - 2 - chloro-1-propanol wherein the branched-chain nonyl radical is derived from the "Oxo" process nonanol herein defined there is obtained the correspondingly branched nonyl glycidyl ether; from 3-(2-ethylheptyloxy)-2-chloro-1-propanol there is obtained 2-ethylheptyl glycidyl ether; from branched-chain 3-decyloxy-2-chloro-1-propanol wherein the decyl radical is derived from the above-described "Oxo" process decanol there is obtained the correspondingly branched decyl glycidyl ether; from 3-tert-dodecyloxy-2-chloro-1-propanol there is obtained tert-dodecyl glycidyl ether; from 1-(2-butyloctyloxy)-2-chloro-1-propanol there is obtained 2-butyloctyl glycidyl ether; from branched-chain 3-tridecyloxy-2-chloro-1-propanol wherein the tridecyl radical is derived from the "Oxo" process decanol described above there is obtained the correspondingly branched tridecyl glycidyl ether; from 3-(7-ethyl-2-methyl-4-undecyloxy)-2-chloro-1-propanol there is obtained the 7-ethyl-2-methyl-4-undecyl glycidyl ether; from branched-chain 3-hexadecyloxy-2-chloro-1-propanol wherein the hexadecyl radical is derived from the "Oxo" process hexadecanol described there is obtained the correspondingly branched hexadecyl glycidyl ether; and from 3-tert-octadecyloxy-2-chloro-1-propanol there is obtained tert-octadecyl glycidyl ether.

The presently useful chlorohydrins are advantageously prepared by the reaction of the suitable higher branched-chain alkanol with epichlorohydrin whereby there is formed a predominant amount of the correspondingly branched-chain 1-alkoxy-3-chloro-2-propanol together with a minor amount of the correspondingly branched-chain 3-alkoxy-2-chloro-1-propanol. Since either of these isomeric alkoxychloropropanols are converted to the same alkyl glycidyl ethers, the mixture of isomeric chlorohydrins obtained from the alkanol and epichlorohydrins are conveniently used in the present process.

Glycidic ethers of branched-chain higher alkyl-substituted phenols are likewise readily prepared by the present process. As in the case of the alkoxychloropropanols, there may be employed either the 1-(alkylaryloxy)-3-chloro-2-propanols or the 3-(alkylaryloxy)-2-chloro-1-propanols, or mixtures thereof. For example, either the 1-(tert-octylphenoxy)-3-chloro-2-propanol or the 3-(tert-octylphenoxy)-2-chloro-1-propanol gives tert-octylphenyl glycidyl ether; either the branched-chain 1-(nonylphenoxy)-3-chloro-2-propanol or the branched-chain 3-(nonylphenoxy)-2-chloro-1-propanol wherein the nonyl radical is derived from the above-described "Oxo" process nonanol gives the correspondingly branched-chain nonylphenyl glycidyl ether; either the 1-[(2-ethylheptyl)-phenoxy]-3-chloro-2-propanol or the 3-[(2-ethylheptyl)phenoxy]-2-chloro-1-propanol gives (2-ethylheptyl)phenyl glycidyl ether; either the branched-chain 1-(decylphenoxy)-3-chloro-2-propanol or the branched-chain 3-(decylphenoxy)-2-chloro-1-propanol wherein the decyl radical is derived from the above-described "Oxo" process decanol gives the correspondingly branched-chain decylphenyl glycidyl ether; either the 1-(4-tert-dodecylphenoxy)-3-chloro-2-propanol or the 3-(4-tert-dodecylphenoxy)-2-chloro-1-propanol gives the 4-tert-dodecylphenyl glycidyl ether; either the branched-chain 1-(2-tridecylphenoxy)-3-chloro-2-propanol or the branched-chain 3-(2-tridecylphenoxy)-2-chloro-1-propanol wherein the tridecyl radical is derived from the above-described "Oxo" process tridecanol gives the correspondingly branched-chain 2-tridecylphenyl glycidyl ether; either the 1-(3-tert-octadecylphenoxy)-3-chloro-2-propanol or 3-(3-tert-octadecylphenoxy)-2-chloro-1-propanol to give 3-tert-octadecylphenoxy glycidyl ether; branched chain 1-[α-(β-nonylnaphthyl)oxy]-3-chloro-2-propanol or branched-chain 3-[α-(β-nonylnaphthyl)oxy]-2-chloro-1-propanol to give the correspondingly branched-chain α-(β-nonylnaphthyl) glycidyl ether; 1-{β-[α-(2-butyloctyl)naphthyloxy]} - 3 - chloro - 2-propanol or 3 - {β - [α - (2-butyloctyl)naphthyloxy]} - 2 - chloro-1-propanol to give β-[α-(2-butyloctyl)naphthyl] glycidyl ether; 1-[4-(4'-tridecylxenyloxy)]-3-chloro-2-propanol or 3-[4-(4'-tridecylxenyloxy)]-2-chloro-1-propanol wherein the tridecyl radical is branched and is derived from the above-described "Oxo" process tridecanol to give the correspondingly branched-chain 4-(4'-tridecylxenyl) glycidyl ether, etc.

The presently provided process is likewise applicable to the production of either the higher branched-chain alkyl glycidyl thio ethers or alkylaryl glycidyl thio ethers in which the alkyl radical is branched and has from 8 to 18 carbon atoms and the aryl radical has from 6 to 12 carbon atoms. Instead of employing alkoxy or (alkylaryl) oxy-substituted chloropropanols, as in the production of the glycidyl oxygen ethers, there are used the branched-chain higher alkylthiochloropropanols or arylthiochloropropanols having a branched-chain higher alkyl substituent in the aryl radical; thus

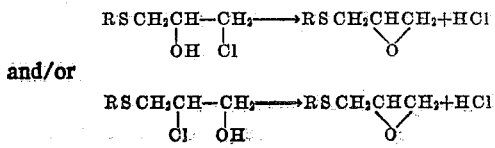

and/or wherein R is either a branched-chain alkyl radical of from 8 to 18 carbon atoms or an aryl radical of from 6 to 12 carbon atoms carrying as a substituent a branched-chain alkyl radical of from 8 to 18 carbon atoms. For example, the present process provides for the preparation of tert-octyl glycidyl thio ether from either 1-tert-octylthio-3-chloro-2-propanol or 3-tert-octylthio-2-chloro-1-propanol or a mixture of the same wherein the octylthio radical is derived from the branched-chain octanethiol obtained by the reaction of hydrogen sulfide and butylene dimer; tert-dodecyl glycidyl thio ether from either 1-tert-dodecylthio-3-chloro-2-propanol or 3-tert-dodecylthio-2-chloro-1-propanol or a mixture thereof; tert-hexadecyl glycidyl thio ether from either 1-tert-hexadecylthio-3-chloro-2-propanol or 3-hexadecylthio-2-chloro-1-propanol; tert-octadecyl glycidyl thio ether from either 1-tert-octadecylthio-3-chloro-2-propanol or 3-tert-octadecylthio-2-chloro-1-propanol; 4-(2-ethylhexyl)phenyl glycidyl thio ether from either 1-[4-(2-ethylhexyl)phenyl]thio-3-chloro-2-propanol or 3-{[4-(2-ethylhexyl) - phenyl]thio}-2-chloro-1-propanol; branched-chain 4-nonylphenyl glycidyl thio ether wherein the nonyl radical is derived from the "Oxo" process branched-chain nonanol described above, said thio ether being derived according to the present process for either the appropriately branched-chain 1[(4-nonylphenyl)thio]-3-chloro-2-propanol or 3-[(4-nonylphenyl)thio]-2-chloro-1-propanol; branched-chain 3-decylphenyl glycidyl thio ether from either the appropriately branched-chain 1-[(3-decylphenyl)thio]-3-chloro-2-propanol or 3-[(3-decylphenyl)thio]-2-chloro-1-propanol wherein the decyl radical is derived from the above-described "Oxo" process decanol; 4-tert-dodecylphenyl glycidyl thio ether from either 1-[(4-tert-dodecylphenyl)thio]-3-chloro-2-propanol or 3-[(4-tert-dodecylphenyl)thio]-2-chloro-1-propanol; branched-chain 4-tridecylphenyl glycidyl thio ether, wherein the tridecyl radical is derived from the above-described "Oxo" process tridecanol, from either the appropriately branched-chain 1-[(4-tridecylphenyl)-thio]-3 - chloro - 2 - propanol or 3[(4-tridecylphenyl)thio]-2-chloro-1-propanol; 2-tert-hexadecylphenyl glycidyl thio ether from either 1-[(2-tert-hexadecylphenyl)thio]-3-chloro-2-propanol or 3-[(2-tert-hexadecylphenyl)thio]-2-chloro-1-propanol; 4-tert-octadecylphenyl glycidyl thio ether from either 1-[(4-tert-octadecylphenyl)thio]-3-chloro-2-propanol or 3-[(4-tert-octadecylphenyl)thio]-2-chloro-1-propanol; branched-chain β-(α-tridecylnaphthyl) glycidyl thio ether, wherein the tridecyl radical is derived from the above-described "Oxo" process tridecanol, from either the appropriately branched-chain 1-[β(α-tridecylnaphthyl)thio]-3-chloro-2-propanol or 3-[β-(α-tridecylnaphthyl)thio]-2-chloro-1-propanol; 4-(4'-decylxenyl) glycidyl thio ether, wherein the decyl radical is branched and is derived from the above-described "Oxo" process decanol, from either the appropriately branched-chain 1-[4-(4'-decylxenyl)-thio]-3-chloro-2-propanol or 3-[4-(4'-decylxenyl)thio]-2-chloro-1-propanol or a mixture thereof.

Formation of the glycidyl ethers or thio ethers according to the invention takes place readily by contacting the appropriate chlorohydrin or chlorohydrin mixtures with aqueous alkali metal hydroxide in the presence of a dialkyl sulfoxide. Useful alkali metal hydroxides include sodium, potassium or lithium hydroxides. Advantageously, the dialkyl sulfoxides are those in which there are present from 1 to 5 carbon atoms in each alkyl radical, e.g., dimethyl sulfoxide, diethyl sulfoxide, dipropyl sulfoxide, di-n-butyl sulfoxide, di-tert-amyl sulfoxide, ethyl methyl sulfoxide, n-amyl n-propyl sulfoxide, etc. Generally, the alkali metal hydroxide is present in a moderately concentrated aqueous solution, e.g., the normality of the solution will range from, say, 5–15 N. The quantity of sulfoxide employed depends somewhat on the nature of the individual chlorohydrin and upon the amount of alkali hydroxide present. However, there should be present a quantity of sulfoxide which is at least 10% by weight of the chlorohydrin and preferably from 25% to 100% of the chlorohydrin. Advantageously, substantial equal volumes of the sulfoxide and the chlorohydrin are employed. A molecular equivalent of alkali metal hydroxide with respect to the chlorohydrin should be present and I have found that the best yields are obtained by employing a slight excess of the hydroxide, say from about 1.1–1.5 moles of hydroxide per mole of the chlorohydrin. Conversion of the chlorohydrin to the glycidyl ether or thio ether takes place by contacting the chlorohydrin with the aqueous alkali hydroxide and dialkyl sulfoxide at ordinary or moderately decreased or moderately increased temperatures; e.g., at temperatures of from minus 10° C. to 80° C. External heating need not generally be employed, although under certain conditions, e.g., when reaction is effected in the presence of dilute aqueous alkali metal hydroxide or in the presence of a proportion of sulfoxide which is near the limiting 25% proportion, external heating may be used. Generally, the mixture of chlorohydrin, aqueous alkali metal hydroxide, and sulfoxide is simply agitated for a time, of, say, a few minutes to several hours without the application of either external heating or cooling. When the dehydrochlorination reaction has been completed, which can be noted by cessation in change of refractive index, the glycidyl ether is separated from the reaction mixture by customary isolation procedures. By-product salt, which is formed by reaction of the evolved halide with the alkali metal hydroxide, may be removed by filtration. Preferably, the ether product is recovered by solvent extraction, whereby the upper layer is separated, water-washed to remove any residual salt and sulfoxide, and finally distilled. The lower layer, which comprises most of the sulfoxide, can be recycled in a continuous process. Generally, good results are obtained by simply filtering the crude reaction mixture to remove the salt and allowing the filtrate to stratify, whereby the ether product is recovered as the upper layer. Water washing of said layer generally gives a satisfactory ether product without further purification steps. The glycidyl ethers thus obtained are directly useful for a variety of commercial and agricultural applications. As disclosed in my copending application, Serial No. 734,849, filed of even date, the branched-chain tridecyl glycidyl ether is readily converted, by reaction with alkali metal sulfite to the exceptionally valuable surfactant sodium 2-hydroxy-3-tridecyloxy-1-propane-sulfonate.

The present invention is further illustrated, but not limited, by the following examples:

*Example 1*

This example describes the preparation of a branched-chain tridecyl glycidyl ether wherein the tridecyl radical is derived from the branched-chain tridecanol obtained according to the "Oxo" process by the high pressure, high temperature reaction of carbon monoxide and hydrogen with an olefin polymer selected from the class consisting of tetrapropylene and triisobutylene.

Into a separatory funnel, there were placed 104 g. (0.355 mole) of a mixture of chlorohydrins consisting of a major amount of 1-tridecyloxy-3-chloro-2-propanol and a minor amount of 3-tridecyloxy-2-chloro-1-propanol, 100 g. of dimethyl sulfoxide and 40 g. (0.40 mole) of 40% aqueous sodium hydroxide. The mixture was allowed to stand for 30 minutes, during which time it was shaken several times and the temperature was noted to rise to 37° C. It was then filtered to remove the salt which had separated. The filtrate was allowed to stratify and the top, oily layer recovered. This was washed with water to give 91.5 g. (100% theoretical yield) of tridecyl glycidyl ether wherein the tridecyl radical is as defined above.

*Example 2*

A mixture consisting of 380.3 g. (1.516 moles) of branched-chain 1-decyloxy-3-chloro-2-propanol, 237 g. (3.0 moles) of dimethyl sulfoxide and 303 ml. of 10 N aqueous sodium hydroxide was stirred vigorously for 2 hours and 25 minutes, during which period the refractive index of the oily upper layer from the stratified reaction mixture decreased from $n_D^{25}$ 1.4423 to $n_D^{25}$ 1.4400. The resulting reaction mixture was poured into one liter of water, and extracted with hexane. After washing the hexane extract with water and drying, it was distilled to give 314.2 g. (96.7% theoretical yield) of the substantially pure branched-chain decyl glycidyl ether, B.P. 88–92° C./0.5 mm., $n_D^{25}$ 1.4394.

The branched-chain decyl radical of the presently employed 1-decyloxy-3-chloro-2-propanol was derived from the branched-chain tridecanol obtained according to the "Oxo" process by the high temperature, high pressure reaction of carbon monoxide and hydrogen with propylene trimer.

*Example 3*

To a mixture consisting of 97 g. of the branched-chain 1-tridecyloxy-3-chloro-2-propanol described in Example 1 and 46.6 ml. of approximately 14.3 N aqueous sodium hydroxide, there was added 50 ml. of dimethyl sulfoxide. Stirring was initiated, and an immediate precipitate of sodium chloride developed. After stirring the mixture for 2 hours, it was water-washed and distilled to give 78.4 g. (93% theoretical yield) of the substantially pure branched-chain tridecyl glycidyl ether B.P. 106–120° C./0.2 mm.

*Example 4*

A mixture consisting of 88.5 g. (0.30 mole) of a branched-chain 1-dodecylthio-3-chloro-2-propanol, 50 ml. of dimethyl sulfoxide and 50 g. (0.50 mole) of 40% aqueous sodium hydroxide was mechanically agitated for 2 hours. The resulting reaction mixture was diluted with water to dissolve the salt which had precipitated out, and the diluted product extracted with hexane. Distillation of the extract gave 69.5 g. (89.6% theoretical yield) of the substantially pure branched-chain dodecyl glycidyl thio ether, B.P. 97–107° C./0.1 mm., $n_D^{25}$ 1.4770.

The branched-chain dodecyl radical of the presently employed dodecylthiochloropropanol was derived from the branched-chain dodecanethiol obtained by reaction of hydrogen sulfide with an olefin polymer selected from the class consisting of triisobutylene and tetrapropylene.

*Example 5*

A mixture consisting of 139.3 g. (0.5 mole) of 1-(2-butyloctyloxy)-3-chloro-2-propanol, 100 ml. of dimethyl sulfoxide and 100 g. of 40% aqueous sodium hydroxide was mechanically shaken for 16 hours. The resulting reaction mixture was diluted with water and extracted with hexane. After drying the extract over magnesium sulfate, it was distilled to give 111.9 g. (92.3% theoretical yield) of the substantially pure 2-butyloctyl glycidyl ether, B.P. 98–114° C./0.1 mm.

*Example 6*

A mixture consisting of 472 g. (2.12 moles) of 1-(2-ethylhexyloxy)-3-chloro-2-propanol, 400 ml. of 10 N aqueous sodium hydroxide (4.0 moles) and 240 ml. of dimethyl sulfoxide was stirred for 1.5 hours. The resulting reaction mixture was extracted with hexane, the extract was washed with water, dried over magnesium sulfate and filtered. Distillation of the filtrate gave 380.6 g. (97% theoretical yield) of 2-ethylhexyl glycidyl ether, B.P. 60–61.5° C./0.3 mm., $n_D^{25}$ 1.4325.

What I claim is:

1. The process which comprises contacting, in the presence of water, a chlorohydrin of the formula

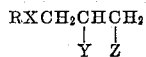

where R is selected from the class consisting of branched-chain alkyl radicals of from 8 to 18 carbon atoms and alkyl-substituted aromatic hydrocarbon radicals wherein the alkyl radical is branched and has from 8 to 18 carbon atoms and the aromatic hydrocarbon radical has from 6 to 12 carbon atoms, X is selected from the class consisting of oxygen and sulfur and Y and Z are dissimilar radicals selected from the class consisting of OH and Cl, with from 1.0 to 1.5 molar equivalents, based on the chlorohydrin, of a hydroxide selected from the class consisting of sodium, potassium and lithium hydroxides and from 10% to 100% of dimethyl sulfoxide based on the weight of the chlorohydrin, and recovering from the resulting reaction product a glycidyl ether of the formula

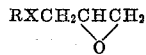

wherein R and X are as herein defined.

2. The process which comprises contacting, in water, a branched chain 1-alkoxy-3-chloro-2-propanol having from 8 to 18 carbon atoms in the alkoxy radical, with from 1 to 1.5 molar equivalents, based on the 1-alkoxy-3-chloro-2-propanol, of a hydroxide selected from the class consisting of sodium, potassium and lithium hydroxides and from 10% to 100% of dimethyl sulfoxide, based on weight of the 1-alkoxy-3-chloro-2-propanol, and recovering from the resulting reaction product an alkyl glycidyl ether wherein the alkyl radical is branched and has from 8 to 18 carbon atoms.

3. The process which comprises contacting, in water, a branched-chain 1-alkylthio-3-chloro-2-propanol wherein the alkyl radical has from 8 to 18 carbon atoms with from 1 to 1.5 molar equivalents, based on the 1-alkylthio-3-chloro-2-propanol, of a hydroxide selected from the class consisting of sodium, potassium and lithium hydroxides and from 10% to 100% of dimethyl sulfoxide, based on the weight of the 1-alkylthio-3-chloro-2-propanol, and recovering from the resulting reaction product an alkyl glycidyl thioether wherein the alkyl radical is as herein defined.

4. The process which comprises contacting, in water, a mixture consisting of branched-chain 1-alkoxy-3-chloro-2-propanol and branched-chain 3-alkoxy-2-chloro-1-propanol having from 8 to 18 carbon atoms in the alkoxy radical with from 1 to 1.5 molar equivalents, based on said mixture of a hydroxide selected from the class consisting of sodium, potassium and lithium hydroxides and from 10% to 100% of dimethyl sulfoxide, based on the weight of said mixture, and recovering from the resulting reaction product an alkyl glycidyl ether wherein the alkyl radical is branched and has from 8 to 18 carbon atoms.

5. The process which comprises contacting, in water, branched-chain 1-tridecyloxy-3-chloro-2-propanol with from 1 to 1.5 molar equivalents, based on the 1-tridecyloxy-3-chloro-2-propanol, of sodium hydroxide and from 25% to 100% of dimethyl sulfoxide, based on the weight of the 1-tridecyloxy-3-chloro-2-propanol, and recovering branched-chain tridecyl glycidyl ether from the resulting reaction product.

6. The process which comprises contacting, in water, a mixture consisting of branched-chain 1-tridecyloxy-3-chloro-2-propanol and branched-chain 3-tridecyloxy-2-chloro-1-propanol with from 1 to 1.5 molar equivalents, based on said mixture of sodium hydroxide, and from 25% to 100% of dimethyl sulfoxide, based on the weight of said mixture, and recovering branched-chain tridecyl glycidyl ether from the resulting reaction product.

7. The method which comprises contacting, in water, branched-chain 3-decyloxy-1-chloro-2-propanol with from 1 to 1.5 molar equivalents, based on the weight of the 3-decyloxy-1-chloro-2-propanol, of sodium hydroxide and from 25% to 100% dimethyl sulfoxide, based on the weight of the 3-decyloxy-1-chloro-2-propanol, and recovering branched-chain decyl glycidyl ether from the resulting reaction product.

8. The method which comprises contacting, in water, branched-chain 1-dodecylthio-3-chloro-2-propanol with from 1 to 1.5 molar equivalents, based on the 1-dodecylthio-3-chloro-2-propanol, of sodium hydroxide and from 25% to 100% of dimethyl sulfoxide, based on the weight of the 1-dodecylthio-3-chloro-2-propanol, and recovering branched-chain dodecyl glycidyl thioether from the resulting reaction product.

9. The method which comprises contacting, in water, 1-(2-butyloctyloxy)-3-chloro-2-propanol with from 1 to 1.5 molar equivalents based on the 1-(2-butyloctyloxy)-3-chloro-2-propanol, of sodium hydroxide and from 25% to 100% by weight of dimethyl sulfoxide, based on the weight of the 1-(2-butyloctyloxy)-3-chloro-2-propanol, and recovering 2-butyloctyl glycidyl ether from the resulting reaction product.

10. The method which comprises contacting, in water, 1-(2-ethylhexyloxy)-3-chloro-2-propanol with from 1 to 1.5 molar equivalents based on the 1-(2-ethylhexyloxy)-3-chloro-2-propanol, of sodium hydroxide and from 25% to 100% by weight of dimethyl sulfoxide, based on the weight of the 1-(2-ethylhexyloxy)-3-chloro-2-propanol, and recovering 2-ethylhexyl glycidyl ether from the resulting reaction product.

References Cited in the file of this patent

UNITED STATES PATENTS

| | | |
|---|---|---|
| 2,453,634 | Marple | Nov. 9, 1948 |
| 2,512,996 | Bixler | June 27, 1950 |

FOREIGN PATENTS

| | | |
|---|---|---|
| 464,698 | Canada | Sept. 17, 1940 |

OTHER REFERENCES

Cohen: J.A.C.S., vol. 75, April 5, 1953, p. 1733.
Kornblum: J. Org. Chem., vol. 22 (1957), p. 455.
Noller: Chemistry of Organic Compounds (1957), p. 284.